United States Patent [19]

Martens et al.

[11] Patent Number: 5,028,683
[45] Date of Patent: Jul. 2, 1991

[54] ELECTRON-BEAM CURABLE POLYURETHANE COMPOSITIONS; AND METHOD

[75] Inventors: John A. Martens, North Oaks, Minn.; Burke R. Blevins, Camarillo, Calif.

[73] Assignee: Minnesota Mining and Manufacturing Company, St. Paul, Minn.

[21] Appl. No.: 184,834

[22] Filed: Apr. 22, 1988

[51] Int. Cl.$^5$ ............................................. C08G 18/67
[52] U.S. Cl. ..................................... 528/75; 522/162
[58] Field of Search .......................................... 528/75

[56] References Cited

U.S. PATENT DOCUMENTS

| | | | |
|---|---|---|---|
| 3,043,807 | 7/1962 | Snyder et al. | 260/75 |
| 3,376,266 | 4/1968 | Hoegger et al. | 260/77.5 |
| 3,552,999 | 1/1971 | Shima et al. | 117/76 |
| 3,856,757 | 12/1974 | Satomura | 260/77.5 |
| 3,871,908 | 3/1975 | Spoor et al. | 117/93.31 |
| 4,320,221 | 3/1982 | Hoffman | 528/69 |
| 4,366,301 | 12/1982 | LeRoy et al. | 528/66 |
| 4,367,302 | 1/1983 | LeRoy et al. | 528/75 |
| 4,387,139 | 6/1983 | Herwig et al. | 428/423.7 |
| 4,408,020 | 10/1983 | Kolycheck | 528/75 |
| 4,443,490 | 4/1984 | Nakajima et al. | 427/44 |
| 4,446,286 | 5/1984 | Kolycheck et al. | 525/455 |
| 4,467,078 | 8/1984 | Kolycheck et al. | 525/455 |
| 4,683,280 | 7/1987 | Ukachi et al. | 528/75 |
| 4,727,126 | 2/1988 | Chen | 528/75 |
| 4,762,902 | 8/1988 | Murphy | 528/75 |
| 4,786,657 | 11/1988 | Hammar et al. | 528/75 |
| 4,910,281 | 3/1990 | Johnson | 528/75 |
| 4,921,930 | 5/1990 | Johnson | 528/75 |

FOREIGN PATENT DOCUMENTS

| | | |
|---|---|---|
| 0062995 | 10/1982 | European Pat. Off. . |
| 8028480 | 8/1978 | Japan ..................................... 528/75 |
| 82/01099 | 4/1982 | PCT Int'l Appl. . |
| 2084589 | 4/1982 | United Kingdom . |

OTHER PUBLICATIONS

Rand, William M., Jr., "Electron Curing of Magnetic Coatings", *Radiation Curing*, Feb., 1983, pp. 26-28 and 30-31.

*Primary Examiner*—Earl Nielsen
*Assistant Examiner*—Rabon Sergent
*Attorney, Agent, or Firm*—Gary L. Griswold; Walter N. Kirn; David B. Kagan

[57] ABSTRACT

A method and agent for improving polyurethane binder compositions are provided. The method comprises introducing into the polyurethane backbone a diol residue including a double bond therein. Preferably the double bond is positioned in a moiety pendant from the polyurethane backbone. In preferred compounds, the double bond-containing residue is introduced in sufficient quantities to provide at least one double bond every 2,000-3,000 molecular weight units of polymer. Preferred agents include acrylate-, methacrylate-, acrylamide-, norbornenyl-, and cyclohexenyl-groups. Preferred compositions, both cured and uncured, are provided. Also, use of such a composition in magnetic recording media is described.

6 Claims, No Drawings

ELECTRON-BEAM CURABLE POLYURETHANE COMPOSITIONS; AND METHOD

FIELD OF THE INVENTION

The present invention relates to curable polyurethane compositions, and in particular to polyurethane compositions advantageously curable upon irradiation. The invention particularly concerns compositions which are relatively viscous when uncured, and which readily cure to form strong, flexible, durable adhesives or binders. Cured compositions according to the present invention are particularly useful as binders for magnetic pigments used in magnetic recording media such as audio tapes, video tapes, computer disks and the like.

BACKGROUND OF THE INVENTION

Various types of curable polymer compositions are known. Generally, such compositions include relatively high molecular weight compounds which, upon curing, form an integrated network or structure. The curing may be by a variety of means, including: through use of chemical curing agents; use of catalysts; and, by irradiation. The final physical properties of the cured material are a function of a variety of factors, most notably: number and weight average polymer molecular weights; cross-link density; the structure of the polymer backbone; and, the nature of additives or adjuvants etc. The term "cured", as used herein, means cross-linked or chemically transformed to a set or relatively insoluble condition.

The present invention particularly concerns binders to hold magnetically susceptible or magnetizable particles in a matrix and to adhere them to a substrate of a magnetic recording medium. For example, the present invention concerns binder compositions usable for audio tape, video tape, computer disks or the like. While it is foreseen that binder compositions according to the present invention may be used for other purposes, and in other industries, they are particularly well-suited for application to the magnetic recording media industry.

Generally, a magnetic recording medium comprises a substrate, in the form of a tape or a disk, on which is coated a magnetic recording layer comprising a polymeric binder composition having magnetically susceptible pigment dispersed therein. The binder/pigment composition is coated on the substrate to a desired thickness, and is then dried and cured to bind the pigment to the substrate.

The magnetic pigment, which stores video, audio or other information, generally comprises needle-like particles, typically less than one micron in length. Commonly used pigments include gamma iron oxides, doped iron oxides, and chromium dioxide. The pigment loading, i.e. the weight or volume percent of pigment in the coated composition, is generally high, since recording "bit" density is important. Generally, oxide loadings range from about 55 to 90% of the weight of a solid cured film.

A variety of substances are used for the substrate, including aluminum disks and flexible polyester films. Flexible substrates may be provided in a variety of forms, including tapes, disks, etc.

Cross-linkable polyurethanes are a particularly useful family of resins usable in binder compositions. Reasons for this include the fact that cured polyurethanes generally exhibit good abrasion resistance. That is, they are relatively tough, and do not rapidly wear off, for example when being rubbed across a recording head or the like. Further, they generally operate well over a relatively wide temperature range and, thus, will withstand storage in cold warehouses, and will also operate well on hot equipment. Polyurethanes are also readily available, easily handled, and their chemical and physical properties are fairly well known and widely studied.

In a typical manufacturing process, a dispersion is prepared of the uncured polymer resin and a magnetic pigment, in a readily evaporated solvent such as tetrahydrofuran, cyclohexanone, methyl ethyl ketone, toluene, or methyl isobutyl ketone. The dispersion is then coated onto the substrate, dried and cured. In many instances the dispersion includes adjuvants, such as lubricants, wetting agents or the like, therein to facilitate manufacture and performance of the final product.

In many conventional applications the polyurethane polymer is thermally cured. Typically, thermal curing agents comprise multi-functional isocyanate oligomers, which are thought to promote cure via chemical reaction with active hydrogen-containing functional groups (carbamate, —NH groups or hydroxyl groups) in the polyurethane polymers. Typical curing agents are bi- and preferably tri-functional, to generate substantial cross-linking.

There have been a number of problems with thermal cured systems. Many of these problems relate to the following:

1. First, it is a slow chemical process. A substrate having a partially cured magnetic coating thereon must be stored in a curing location for a considerable period of time, often three to seven days.

2. If tape, such as video tape or the like, is involved, then extremely long tapes are curing while rolled up in reel-like form. Under such circumstances, blocking of the tape coatings can occur, in which adhesion increases with time between adjacent layers of tape in the reel. Upon attempting to unwind the tape at some later time, one finds that the blocking phenomenon has damaged the magnetic tape surface irreparably. While in some instances this may be controlled through utilization of appropriate surface lubricants, it is nevertheless a problem and involves added expense and increased care.

3. Long curing ovens may be needed, which use valuable production space and consume large quantities of thermal energy.

4. Many curing agents undergo numerous side reactions. For example, isocyanates react readily with water. Consistency of cure may be difficult to achieve, due to variations in humidity, and other means of contamination with water. A consistent, high quality, binder film, however, is important for good overall product operation.

5. Curing agents begin to react with reactive moieties in the polyurethane resin, as soon as they are placed in a composition or mixture therewith. Thus, some curing can occur before the dispersion is applied to the substrate. Problems with uncontrolled increase in dispersion viscosity with time, include: difficulties in handling the dispersion solution; difficulties in obtaining consistency of cure, and constant film composition and thickness; difficulties in obtaining appropriate orientation of the pigment on the substrate; and, difficulties due to loss of material, should a production run be stopped or delayed for any reason after the resin has begun curing.

6. Another problem with thermal or chemical curing agents is that they typically only generate cross-linking at active hydrogen-containing reactive sites (carbamate or hydroxyl groups) in the polyurethane. Thus, cross-link density is limited by the presence of these active functional groups. Some preferred polyurethanes include relatively few carbamate and hydroxyl moieties therein, per unit weight. The amount of cross-linking for such polyurethanes, even using high concentrations of curing agents, would be relatively low. Greater cross-link density may be desirable if a relatively strong binder film is desired.

7. In binder coatings such as are used in magnetic recording media, it is desirable to eliminate any non-cross-linked polymer. Non-cross-linked polymer, which remains extractable when the polymer film is immersed in a solvent, can migrate or "bloom" to the tape surface, and can interfere with recording heads or the like. It is desirable, from experience, to maintain the percent by weight extractable polymer at less than about 3 wt.%. In thermally cured systems, i.e. systems cross-linked by means of isocyanate or the like, a substantial amount of curing agent may be necessary in order to achieve less than 3 wt.% extractable polymer. This adds cost, since a substantial amount of curing agent may be necessary. Further, control of side reactions, especially with such a high amount of curing agent, may be a problem as indicated above.

In efforts to avoid thermal curing agents, resin compositions usable as binders for magnetic recording media have been developed which are cured upon exposure to ionizing radiation. Polyurethane compositions have been developed which are cured through a variety of free radical reactions initiated by various types of irradiation. A useful method of irradiation is electron-beam irradiation, since with electron beam (EB) irradiation a relatively quick, substantially complete cure can be obtained.

Known electron-beam cured polyurethane compositions have not been completely satisfactory, when applied as binding agents for magnetic pigments or the like. For example, if relatively low molecular weight polymer compositions are used in the formulation, the dried coatings (before cure) tend to be tacky and easily damaged (for example by incidental contact with harder surfaces such as idler rolls in the manufacturing process). Also, cross-link density is still not particularly high, so the cured resin is not very strong.

SUMMARY OF THE INVENTION

According to the present invention, a class of chain extension agents is provided, for introduction into a polyurethane backbone, in order to facilitate curing through free radical processes initiated by applied irradiation, and to improve the physical and chemical characteristics of the resulting resin composition. The particular chain extension agents usable according to the present invention include therein a reactive unsaturated moiety, preferably particularly sensitive to, and available for, reaction upon curing via free radical reactions or the like to generate cross-linking. Preferred unsaturation moieties in chain extension agents according to the present invention are carbon-carbon double bonds (olefinic bonds), and particularly preferred moieties are activated carbon-carbon double bonds. Generally, "activated" carbon-carbon double bonds in a class of chain extension agents utilizable according to the present invention include: double bonds activated through conjugation with a carbonyl group; those bonds activated due to substitution by various other groups generally tending to stabilize free-radical formation and hence activate the double bond toward free radical reactions; and, those bonds activated through inclusion in a cyclic structure.

In preferred chain extension agents according to the present invention, the "activated" double bond is oriented such that, when the chain extension agent is incorporated into the polymer backbone, i.e. between urethane units, the activated double bond is in a portion of the polymer molecule remote from, or pendant to, the polymer backbone. That is, the activated double bond does not itself form part of the polymer backbone, but rather it is oriented in a group pendant therefrom. Advantages obtained from this are described in detail below, and generally relate to preferred physical characteristics of the resulting cross-linked system.

A general chemical characteristic of chain extension agents according to the present invention is that they are di-hydroxy substituted organic compounds, which contain an activated double bond therein. Preferably no more than two hydroxy groups are included in the compound, so that the chain extension agents do not generate substantial networking and cross-linking, during initial reaction with a polyurethane prepolymer to form the extended polyurethane polymer composition (uncured). Preferably both hydroxy groups are primary, so that reaction with urethane moieties to generate chain extension will be relatively rapid, and will compete effectively with other classes of chain extension agents, described below, utilizable to provide for other advantageous chemical and physical characteristics in the composition. The preferred compounds for primary chain extension agents according to the present invention are those compounds having one hydroxy group on each of two terminal methylene groups in compounds having 3-5 carbon atom chains, or 3-5 member chains which include a heteroatom, such as nitrogen, therein. A preferred chain extension agent is: N,N-bis(2-hydroxyethyl),N'-(methacryloxyethyl)urea:

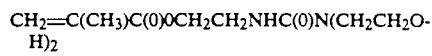

In preferred applications of the present invention, an activated double bond-containing chain extension agent is incorporated into a polymer to be cured such that, on the average, there is about 1 pendant, activated, unsaturation site provided every 2,000–3,000 molecular weight units in the polymer. For preferred applications as binders in magnetic media, the number average molecular weight of chains in the polymer should be about 25,000–30,000, corresponding to a weight average molecular weight of about 50,000–60,000. The introduction of activated double bonds into the polymer may be readily accomplished through reaction of the chain extension agent with a diisocyanate oligomer having a number average molecular weight of about 5,000–10,000. Such polyurethane prepolymer compounds or compositions are widely known, and preparable or readily available.

Improved curable polymer compositions according to the present invention include a variety of other components and adjuvants therein, described in detail below. These include both: compositions chemically incorporated into the polymer; and, also, mere additives to the overall polymer composition, not incorporated into the polymer backbone. Materials incorporated into the polymer backbone include: relatively short chain-extension agents which do not include a reactive double bond therein, which chain-extension agents operate in a conventional manner as reinforcing agents for the binder to optimize toughness; and, relatively long-chain extension agents which do not substantially cross-link, but which provide soft segments between relatively hard polyurethane segments in the overall cross-linked system, to lead to a flexible, durable, cured polymer.

Adjuvants included in the curable polymer composition, but not chemically bound to the polymer system, include dispersing agents to help disperse the pigment throughout the dispersion; co-binders to improve glass transition temperature, and coating modulus of the cured composition, and pigment dispersion stability of the curable composition; lubricants; and, head cleaning agents, such as abrasive alumina particles ($Al_2O_3$). These may be used in various amounts, and in conventional manners, to yield curable formulations and subsequently cured compositions.

In sum, an uncured improved polyurethane polymer composition according to the present invention generally comprises the reaction product of: an organic diisocyanate composition, which may include a mixture of organic diisocyanates; and, a chain extension agent composition including an effective amount of a difunctional reactant containing a carbon-carbon double bond which, upon reaction with 2 equivalents of the diisocyanate composition, generates a polyurethane polymer composition having polymer units with a carbon-carbon double bond therein. The difunctional reactive composition may, of course, comprise a mixture of compounds. The invention also generally includes within its scope a cured polyurethane polymer comprising a radiation cured reaction product as previously described for the uncured composition. Further, the invention includes within its scope magnetic recording media comprising a substrate having adhered thereto a magnetic pigment dispersed within a cured polyurethane polymer composition, according to the previous description.

DETAILED DESCRIPTION OF THE INVENTION

It is to be understood that the disclosure is merely exemplary of the invention, which may be embodied in various forms and systems. Therefore, specific details disclosed herein are not to be interpreted as limiting, but rather as a basis for the claims and as a representative basis for teaching one skilled in the art to variously employ the present invention in virtually any appropriate system or manner.

The present invention includes within its scope: improved curable polyurethane resin compositions; agents for improving curable polyurethane resin compositions; certain cured systems; and, methods of providing improved curable polyurethane resin compositions, cured polyurethane resins and magnetic recording media products produced from them. Improved polyurethane resin compositions according to the present invention are generally suitable for curing upon irradiation, for example electron-beam (EB) curing. The compositions are particularly well-suited for use as binding agents to hold magnetic particles in a matrix and to bind them to a substrate. Examples of such systems include various types of magnetic recording media including: audio tapes, video tapes, and flexible computer disks or the like.

Binding compositions utilizable for binding magnetically susceptible material to substrates, as above described, generally include the following types of components therein: (a) improved curable polyurethane polymer to be cured; (b) lubricant(s); (c) pigment(s); (d) dispersing agent(s); (e) head cleaning agent(s) and, (f) co-binder(s). The present invention particularly concerns the nature of the improved polyurethane polymer to be cured, components (b)-(f) listed above generally being used, if at all, in a more or less conventional manner, as indicated below.

THE IMPROVED POLYURETHANE POLYMER TO BE CURED

Improved polyurethane polymer resin compositions according to the present invention include a chain extension agent incorporated into the backbone of the polyurethane polymer; the chain extension agent including therein, and preferably pendant to the polymer backbone, an unsaturation site available for cross-linking upon irradiation cure. Typically, for preferred embodiments, the unsaturation site is an activated carbon-carbon double bond.

Preferred polyurethane resins useful in compositions according to the present invention are formed from the following:

(a) an organic diisocyanate;

(b) a preferred chain extension agent according to the present invention having incorporated therein an unsaturation site preferably displaced from the polymer backbone by a spacer group or groups so as to be pendant to the polymer chain after incorporation;

(c) a dihydroxy functional chain extender, preferably containing 2-8 aliphatic carbon atoms or 6-10 carbon atoms in a carbocyclic group, as a reinforcing agent to optimize toughness and other physical characteristics of the polymer; and, (d) a macroglycol chain extender having a molecular weight in the range from about 500 to about 5,000, which provides soft segments in the polymeric composition, between the rather hard polyurethane segments.

It will be readily understood that the above four components may be varied in structure and relative amounts in the curable compositions, in a manner permitting production of a wide variety of useful binders having a wide variety of chemical and physical properties. Desired uncured and cured properties can be readily obtained, and predictably and consistently generated. Thus, application of the present invention improves considerably the problem of obtaining a good useful binder composition.

Organic diisocyanates usable in forming polyurethane resin compositions according to the present invention may be of a variety of types. Generally, diisocyanates having an average molecular weight of about 168 to about 450 are preferred. These include, for example:

4,4'-di(isocyanatophenyl)methane
4,4'-di(isocyanatocyclohexyl)methane
2,4-toluene diisocyanate
2,6-toluene diisocyanate
p-phenylene diisocyanate
1,6-hexamethylene diisocyanate The remaining above discussed chemical reactants utilized for forming the polyurethane polymer generally comprise diols, each having preferred characteristics to impart certain desired chemical and physical properties to the resulting polyurethane. A first of these is a chain extending diol component having relatively low hydroxyl equivalent weight, mentioned above as component (c), which reacts to become located between urethane moieties, upon reaction with an equivalent of diisocyanate at each hydroxy group, to form relatively short-chain, hard, tough, segments in the backbone of the polyurethane polymer. Particularly preferred diol compounds for this are: 1,4-butane diol; 1,3-(2,2-dimethyl)propylene diol; ethylene glycol; propylene glycol; and, dipropylene glycol. Mixtures of such diols may also be used.

The macroglycol (polyol) utilized in preparing polyurethane polymers according to the present invention are extended chain diols, which react to become located between urethane groups, upon reaction of each hydroxy group with an equivalent of diisocyanate, to form elongate, soft, segments in the resulting polyurethane polymer between rather hard urethane segments. Such segments have been routinely used in providing flexible polyurethane polymers. Suitable polyols include: polyether polyols such as the poly (1,4-butylene) glycols; polyester polyols such as the poly (1,4 butylene adipate) glycols; and, the polycaprolactone glycols, all in the molecular weight range from about 500 to about 5,000. Mixtures of such diols may be used.

Improvements according to the present invention result from the incorporation of yet a third class of diol compound into the polymer-forming reaction mixture, to introduce yet a further characteristic to the resulting polyurethane polymer. In particular, the third class of component comprises a chain extension agent which is difunctional in hydroxyl groups, as far as incorporation into the polymeric backbone is concerned, but which also includes an unsaturated moiety, generally preferably pendant to the resulting polymer chain. More specifically, this chain extension agent is a diol, and is incorporated into the polyurethane polymer through reaction of each one of the two hydroxy groups, with an equivalent of diisocyanate.

Preferably the unsaturated site comprises an activated carbon-carbon double bond. Thus, the double bond is readily available and reactive for cross-linking reaction upon exposure to activating irradiation.

Generally the term "activated," or variants thereof when used in association with an unsaturated moiety of an agent according to the present invention, refers to at least one of two basic types of unsaturation sites. The first of these is those double bonds activated in the sense that free radicals formed thereat will be stabilized by other groups in the molecule, hence facilitating the free radical reaction. Such double bonds include, for example, the carbon-carbon double bonds of alpha-beta unsaturated carbonyl compounds, for example acrylates, methacrylates, and acrylamides. The second type of "activated" double bonds are those double bonds which, for example when incorporated into cyclic or strained bicyclic systems, are relatively reactive. Such double bonds include, for example, norbornenyl, cyclopentenyl- and cyclohexenyldouble bonds.

A preferred activated unsaturation moietyincluding chain extension diol for incorporation into polyurethane polymer compositions according to the present invention is: N,N-Bis(2-hydroxyethyl),N'-(methacryloxyethyl)urea. The structure of this compound is indicated in Table 1 below. The compound is formed from the reaction of 2-isocyanato ethyl methacrylate with diethanol amine, according to the following reaction scheme:

CH$_2$=C(CH$_3$)C(O)OCH$_2$CH$_2$NCO + HN(CH$_2$CH$_2$OH)$_2$→

CH$_2$=C(CH$_3$)C(O)OCH$_2$CH$_2$NHC(O)N(CH$_2$CH$_2$OH)$_2$

Preferred diols (di-hydroxy compounds) for use as chain extension agents according to the present invention are:

(a) acrylate ester diols having a general formula: [H$_2$C=C(R)C(O)0]$_2$C(CH$_2$OH)$_2$, wherein: R is H or an alkyl group haVing from 1-6 carbon atoms;

(b) acrylate-functional urea diols having the general formula: H$_2$C=C(R$^1$)C(O)OCH$_2$CH$_2$NHC(O)N(CH$_2$CH$_2$OH)$_2$ wherein R$^1$ is H or an alkyl group having from 1-6 carbon atoms;

(c) acrylate-functional urea diols having the general formula: CH$_2$=C(R$^2$)C(O)OCH$_2$CH$_2$NHC(O)NHCH$_2$CH$_2$N(CH$_2$CH$_2$-OH)$_2$, wherein R$^2$ is H or an alkyl group having from 1-6 carbon atoms;

(d) 5-norbornene-2,2-dimethanol;

(e) 3-cyclohexene-1,1-dimethanol;

(f) acrylamide-functional diols of the general formula: CH$_2$=C(R$^3$)C(O) NHC(CH$_3$)$_2$C(O)N(CH$_2$CH$_2$OH)$_2$, wherein R$^3$ is H or an alkyl group containing from 1-6 carbon atoms; and, (g) mixtures of materials (a)-(f).

The following table lists, with structures, a plurality of representative compounds which may be utilized as the unsaturation moiety-containing chain extension agent in compositions according to the present invention.

TABLE 1*

I. (Meth)acrylate ester diols

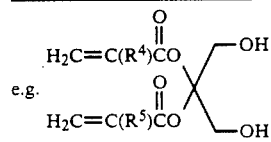

II. (Meth)acrylate functional urea diols e.g.

H$_2$C=C(R$^6$)COCH$_2$CH$_2$NHCN(CH$_2$CH$_2$OH)$_2$

H$_2$C=C(R$^7$)COCH$_2$CH$_2$NHCNHCH$_2$CH$_2$N(CH$_2$CH$_2$OH)$_2$

III. 5-Norbornene-2,2-dimethanol

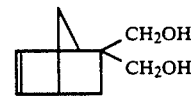

IV. 3-cyclohexene-1,1dimethanol

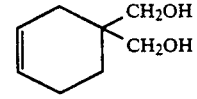

V. (Meth)acrylamide functional diols e.g. H$_2$C=C(R$^8$)CNH—R$^9$—CN(CH$_2$CH$_2$OH)$_2$

*Preferably R$^4$, R$^5$, R$^6$, R$^7$ and R$^8$ are each, independently, —CH$_3$ or —H.

R$^9$ is a 1-5 carbon atom hydrocarbon linking group which is either branched or straight chain, such as

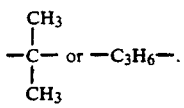

It will be readily observed that each of the compounds listed in Table 1 is a di-primary alcohol. While secondary alcohols may be reacted for incorporation into polyurethane polymers, generally preferred chain extension agents for improvements according to the present invention are primary alcohols. A reason for this is that primary alcohols can readily compete with other diols incorporated into the polymer backbone, for example butane diol or polycaprylactone diols. A substantial incorporation of pendant, activated, double bonds will occur throughout the polymer backbone, enhancing cross-link density.

The relative positions of the hydroxy groups with respect to one another, in the chain extension agent, is not critical. For preferred compounds, however, the hydroxy groups are positioned in carbon chains, or hetero atom-containing chains, of about 3-5 atoms in length. A reason for this is that such compounds are of relatively low molecular weight and easy to handle. They are typically available or their preparation is known, and they will generally not result in undesired modifications to the chemical and physical properties of polyurethane resin compositions. Further, they are sufficiently short as to be unlikely to react twice with the same diisocyanate compound.

From a review of Table 1, it will be understood that unsaturation moiety-containing chain extension agents according to the present invention may include more than one site of unsaturation therein. Such compounds will be especially reactive for cross-linking, and may be used to provide certain desired physical properties in cured compositions. In particular, high cross-link density and a tightly-cured polymer will result.

In polymer resin compositions according to the present invention, generally at least about 1 activated unsaturation moiety should be introduced for about every 2,000-3,000 molecular weight units of polyurethane. This can be readily controlled and repeated and is a function of the reactivity and/or amount(s) of reactant(s) used in forming the polyurethane. Substantially higher quantities of unsaturated moiety may lead to a relatively highly cross-linked, and therefore brittle, binder. Such a binder may have use in many applications, but not typically those involving a flexible polyester tape or disk as the substrate. Substantially less incorporation of unsaturated moiety will generally result in insufficient cross-linking including the activated unsaturated moiety, and hence less than desirable integrity of the binder.

The preferred chain extension agents include unsaturation sites which, when according to the present invention the agent is reacted with diisocyanate prepolymer to form the polyurethane polymer product, will be pendant to the polymer backbone rather than incorporated therein. This makes the activated double bonds very available for cross-linking, especially without interference with hydrogen-bonding in the polymer.

Preferably, the prepolymer includes chains which have a number average molecular weight of about 5,000-10,000. Many such compositions are well-known and are readily available.

The distance of the pendant unsaturation site from the polymer backbone is significant. If the distance of pendency is too great, obtaining significant tight, high density cross-linking may be a problem. That is, the pendant chain may act as a built in plasticizer. If the length of side chain is too short, the cross-linking may cause undesirable interference with hydrogen bonding between carbamate groups in the polymer. The result of this latter condition could be an introduction of undesired inelasticity into the cured product. Preferred pendency is for the reactive double bond to be positioned within a spacer group or chain length of about 4-12, preferably 5-12, atoms from the polymer backbone. This will be understood from a review of the compounds in Table 1.

In general, then, preferred improved polyurethanes according to the present invention include, in their backbone, units as follows:

$$R'HNC(O)-X13(O)CNHR''$$

wherein:

X is the residue of the double bond-containing chain extension agent; by "residue," it is intended that the designation "X" not include reference to the two (intact) hydroxy groups involved in the addition reactions. Again, preferably any double bonds in "X", to be used in cross-linking, are preferably pendant from the polymer backbone. $R'$ and $R''$ simply indicate the remainder of the polymer.

Lubricants

Preferred binder compositions for use in magnetic recording media include a substantial amount of lubricant therein. The lubricant generally protects the magnetic coating from damage when brought into contact with a recording head or the like. A variety of lubricants have been developed which are utilizable in both conventional binder compositions, and compositions according to the present invention. Such lubricants include: fatty acids such as oleic acid, stearic acid, and myristic acid; fatty acid esters such as butyl stearate, hexadecyl stearate, and butyl myristate.

Generally, the lubricant, or mixtures of lubricants, should be incorporated in an amount of about 2 to 10%, by weight, in the overall binder composition (without reference to solvent weight).

Pigment

Binder compositions according to the present invention include a pigment therein which comprises the magnetically susceptible material utilized for storage of interpretable information. A variety of pigments have been developed, including: gamma iron oxides, cobalt-treated iron oxides and chromium dioxide. It is foreseeable that any of these, and a variety of other magnetic pigments, may be utilized in binder compositions according to the present invention. Generally the pigment is utilized in a weight range of about 55-90%, by weight, in the cured binder film.

Dispersing Agents

Binder compositions according to the present invention may also include dispersing agents therein, to facilitate dispersion of the pigments throughout the binder, prior to curing. A variety of conventional dispersing agents, including mixtures, may be utilized, including lecithin. Such agents may typically be used in an amount between about 2 and 10% of the overall pigment composition (without reference to solvent; i.e., by reference to cured binder).

Head Cleaning Agents

Head cleaning agents are generally abrasives incorporated into the binder compositions to abrade the recording head, or similar components of electronic devices in which magnetic recording media according to the present invention are used. Head cleaning agents include, for example, small particles of alumina, $Al_2O_3$. Use of such head cleaning agents is conventional, and binder compositions according to the present invention may utilize head cleaning agents in a conventional manner.

Co-Binders

Binder compositions according to the present invention may also include conventional co-binders therein. Such materials generally improve (increase) the glass transition temperature (Tg), strength, and modulus of the cured coatings and improve the pigment dispersion stability of the curable composition. Suitable co-binders include: vinyl chloride/vinyl acetate co-polymer resins such as VAGH (a product of Union Carbide Corporation); phenoxy resins such as PKHH and PKHC (products of Union Carbide Corporation); and, nitrocellulose resins.

Formation of the Binder Composition

The binder composition is generally made utilizing conventional techniques varied through the incorporation of an appropriate amount of activated double bond-containing chain extension agent(s) according to the present invention. The polyurethane polymer is mixed with a solvent, for example methyl ethyl ketone, along with the pigment and sometimes other components of the composition, although not typically the lubricant(s). This material is generally passed through a conventional mill, such as a sand mill, to grind the pigment to a desired fineness, and to obtain consistent dispersion. Lubricants, if desired, and other solvents may be added to this material. The mixture is then, for example in a conventional manner, coated upon a substrate such as polyester material used for forming computer disks, video tapes or audio tapes, and the solvent is driven off in an oven or the like. A proper surface smoothness is formed through calendering or the like. Finally, the substrate is passed through an irradiation device, such as an electron beam curing device, for cure. Substantial cross-linking throughout the polymer chains occurs, due to incorporation of the activated unsaturation moieties essentially throughout the polymer chain.

Experimental

Experiment 1 - N,N-Bis(2-hydroxyethyl),N'-(methacryloxy ethyl)urea

To prepare the above compound, 46.5 grams (0.30 moles) of 2-isocyanato ethyl methacrylate were combined with 80 grams of methylene chloride ($CH_2Cl_2$) in a 250 ml 3-necked round-bottomed flask, equipped with a stirrer, thermometer, dry nitrogen inlet tube, and an addition funnel. Diethanol amine (30.48 grams, 0.29 moles) was combined with 40 grams of methylene chloride and placed in the addition funnel. The methacrylate solution was cooled to 15° C., after which the diethanol amine solution was added slowly, with agitation. Care was taken to maintain the temperature below about 25° C. during the addition and agitation. Following completion of the amine addition, progress of the reaction was monitored by infrared spectroscopy, which showed no -NCO functionality. 0.67 grams (0.004 moles) of 2-isocyanato ethyl methacrylate and 10 grams of methylene chloride were added. IR spectroscopy showed a small persistent —NCO peak after the addition was complete, indicating that all available —NH groups had been reacted. The methylene chloride solvent was removed by vacuum stripping, with mild heat, to yield 80.1 grams of the subject compound. The compound was characterized by IR, $^1$H and $^{13}$C NMR as follows:

$^1$H NMR (CDCl$_3$): delta, 4.71 (2H, OH), 3.4 (4H, CH$_2$), 3.73 (4H, CH$_2$), 6.51 (1H, NH), 3.4 (2H, CH$_2$), 4.21 (2H, CH$_2$), 1.92 (3H, CH$_3$);

$^{13}$C NMR (CDCl$_3$) delta, 61.0 (2C, CH$_2$), 50.8 (2C, CH$_2$), 167.1 (1C, CO), 39.4 (1C, CH$_2$), 63.4 (1C, CH$_2$), 160.4 (1C, CO), 17.6 (1C, —CH$_3$), 125.4 (1C, =CH$_2$), 135.7 (1C, C=).

IR showed ester, O-C, —C=O stretches at 8.55, 5.79 microns; CH$_2$OH, and C-O stretches at 9.56 microns, urea bands at 6.12 and 6.45 microns. The —OH equivalent weight was 128 (127.5 theoretical) by $\emptyset$-NCO method.

Experiment 2 - Synthesis of Electron-Beam Curable Polyurethane from Acrylate Diol Made According to Experiment 1

A 3.8 liter stainless steel pressure reactor, equipped with heating jacket, agitator, charging port, thermocouple, and drain port, was used to prepare an example curable urethane polymer incorporating the diol chain extension agent from Experiment 1. The following ingredients were combined in a first charge to the reactor: 157.37 grams of 4,4'-diphenyl methane diisocyanate (0.624 moles), 239.2 grams of polycaprolactone diol (0.193 moles-1240 molecular weight), 28.8 grams (0.320 moles) of 1,4-butane diol, and 791 grams of tetrahydrofuran. The charge was heated to 39° C. under nitrogen pressure (413 KPa(Kilo Pascals) and was allowed to react for 22 hours. After cooling to 33° C. under nitrogen pressure, a charge of 26.77 grams (0.105 moles) of the N,N-Bis(2-hydroxy ethyl),N'-(2-methacryloxy ethyl)urea and 0.2 grams of phenothiazine were added through the charging port, along with 100 grams of tetrahydrofuran. Samples were withdrawn every hour, following the addition, for infrared spectroscopic examination. After 5 hours, a —NCO band (at approximately 4.4 microns) had completely disappeared, indicating that the reaction was complete. The reactor was cooled to 60° C., and 700 grams of tetrahydrofuran were added. The contents were drained into a 3.8 liter glass bottle. The inherent viscosity (IV) of the polymer and tetrahydrofuran was determined to be 0.49, indicating a high molecular weight polyurethane had been produced.

Experiment 3 - Synthesis of Control Polyurethane

In a procedure substantially identical to that described in Experiment 2 above, a control urethane was prepared, with the exception that the final reactive charge was 0.105 moles of 1,4-butane diol rather than the acrylate diol of the present invention. In this way, a comparable polymer, excluding the incorporated unsaturation pendant to the polymer backbone, was produced.

Experiment 4 - Testing of Mechanical Properties and Radiation Cross-linking Response Films of approximately 127 micrometers in thickness were prepared from each of the polymer solutions described in Experiments 2 and 3 above, via spin-casting at room temperature. Following spin-drying, the films were allowed to air dry for several days before testing. Samples were exposed to controlled doses of ionizing radiation using a CB-175 Electrocurtain® electron beam accelerator (a product of Energy Sciences, Inc.). Radiation exposures were done in a nitrogen atmosphere. Mechanical testing was done using an Instron tensile tester. Cross-linked polymer gel-fractions were determined by extracting samples of irradiated polymer with boiling tetrahydrofuran in a Soxhlet extraction apparatus. Data are summarized in Table 2 below.

TABLE 2

| Mechanical Properties and Radiation Response of Polymers | | | | | |
|---|---|---|---|---|---|
| POLYMER SAMPLE # | CURE DOSE (MRads) | TENSILE STRENGTH (psi) | % ELONGATION | 100% MODULUS (psi) | GEL-FRACTION (THF) |
| Exp. 2 | 0 | 3892 | 475 | 627 | -0- |
|  | 5 | 2902 | 250 | 1452 | 0.875 |
|  | 10 | 3671 | 200 | 1380 | 0.914 |
| Exp. 3 | 0 | 3563 | 425 | 855 | -0- |
|  | 5 | 3533 | 375 | 908 | 0.05 |
|  | 10 | 2909 | 412 | 768 | 0.12 |

The sample from Experiment 2, which contains the acrylate unsaturation, demonstrates a ready response to ionizing radiation, as shown by increasing 100% modulus, decreasing % elongation, and high gel-fraction at low dose. The sample from Experiment 3, by comparison is unresponsive to radiation.

The polymer from Example 2 has been incorporated into a floppy diskette formulation, and coated on a 3 mil primed polyester film. After drying, the coating was subjected to ionizing radiation in various doses. As determined by gel-permeation chromatography, the coating was well cured at a dose of 5-8 MRads.

WHAT IS CLAIMED AND DESIRED TO BE SECURED BY IS AS FOLLOWS:

1. An electron-beam curable polyurethane polymer having in its backbone segments derived from an unsaturated diol containing a carbon-carbon double bond and selected from the group consisting of:
   (a) acrylate ester diols having a general formula: $C(CH_2OH)_2$, wherein: R is H or an alkyl group having from 1-6 carbon atoms;
   (b) acrylate-functional urea diols having the general formula: $H_2C=C(R^1)C(O)OCH_2CH_2CH_2NH-C(O)N(CH_2CH_2OH)_2$ wherein $R^1$ is H or an alkyl group having from 1-6 carbon atoms;
   (c) acrylate-functional urea diols having the general formula: $CH_2=C(R^2)C(O)OCH_2CH_2CH_2NH-C(O)NHCH_2CH_2N(CH_2CH_2-OH)_2$, wherein $R^2$ is H or an alkyl group having from 1-6 carbon atoms;
   (d) acrylamide-functional diols of the general formula: $CH_2=C(R^3)C(O)NH-R^9-C(O)N(CH_2CH_2OH)_2$, wherein $R^3$ is H or an alkyl group containing from 1-6 carbon atoms, $R^9$ is a 1-5 carbon atom hydrocarbon linking group which is either branched of straight chain; and
   (e) mixtures of materials (a)-(d); segments of a macroglycol compound having a molecular weight of from 500 to 5000; and segments of a short-chain diol selected from the group consisting of an aliphatic diol having 2 to 8 carbon atoms and a carbocyclic diol having 6 to 10 carbon atoms.

2. The electron-beam curable polyurethane polymer of claim 1 wherein the unsaturated diol is incorporated into the backbone of said polyurethane polymer in sufficient amount to provide incorporation of at least about one carbon-carbon double bond every 2,000-3,000 molecular weight units of polyurethane polymer.

3. The electron beam curable polyurethane polymer of claim 1, further comprising segments in the polymer backbone derived from an organic diisocyanate having a number average molecular weight of from about 168 to 450.

4. The electron-beam curable polyurethane polymer of claim 1, wherein the polyurethane polymer has been cured with electron beam radiation.

5. A polyurethane polymer having in its backbone:
   (a) segments derived from an unsaturated diol of the general formula $H_2C=C(R^1)C(O)OCH_2CH_2NH-C(O)N(CH_2CH_2OH)_2$ wherein $R^1$ is H or an alkyl group having from 1 to 6 carbon atoms;
   (b) segments of a macroglycol compound having a molecular weight of from 500 to 5000; and
   segments of a short-chain diol selected from the group consisting of an aliphatic diol having 2 to 8 carbon atoms and a carbocyclic diol having 6 to 10 carbon atoms.

6. The polyurethane polymer of claim 5, wherein the polyurethane polymer has been cured with electron beam radiation.

* * * * *

UNITED STATES PATENT AND TRADEMARK OFFICE
CERTIFICATE OF CORRECTION

PATENT NO. : 5,028,683
DATED : July 2, 1991
INVENTOR(S) : John A. Martens and Burke R. Blevins It is certified that error appears in the above-identified patent and that said Letters Patent is hereby corrected as shown below:

Col. 7, line 56, "cyclohexenyldouble" should be --cyclohexenyl-double--.

Col. 7, line 57, "moietyincluding" should be --moiety-including--.

Col. 13, line 49, "C(CH$_2$OH)$_2$" should be $$--[H_2C=C(R)C(O)O]_2C(CH_2OH)_2--.$$

Col. 14, line 9, "of" should be --or--.

Signed and Sealed this

Twenty-sixth Day of January, 1993

Attest:

STEPHEN G. KUNIN

*Attesting Officer*       *Acting Commissioner of Patents and Trademarks*